United States Patent Office 3,496,170
Patented Feb. 17, 1970

3,496,170
CAROTENOID COMPOUNDS
Albert J. Chechak and Charles D. Robeson, Rochester, N.Y., assignors to Eastman Kodak Company, Rochester, N.Y., a corporation of New Jersey
No Drawing. Filed Mar. 23, 1966, Ser. No. 536,651
Int. Cl. C07c 175/00
U.S. Cl. 260—240
27 Claims

ABSTRACT OF THE DISCLOSURE

Novel carotenoid compounds, useful as food colorants and as additives in poultry feed, of the structural formula:

$$R-A_m-B_n-A'-R'$$

where R is 2,6,6 - trimethylcyclohex - 1 - enyl, 2,6,6 - trimethylcyclohex - 1,3 - dienyl, 2,6,6 - trimethyl - 3 - acetoxycyclohex - 1 - enyl or 2,6,6 - trimethyl - 3 ketocyclohex - 1 - enyl, A is the divalent 3 - methyl - 1,3-butadienyl radical, B is the divalent ethylene radical, A' is the divalent 2-methyl-1,3-butadienyl radical, R' is 2,6,6-trimethylcyclohex - 1 - enyl, 2,6,6-trimethylcyclohex-1-3-dienyl, 2,6,6 - trimethyl - 3 - acetoxycyclohex-1-enyl, 2,6,6 - trimethyl - 3 - ketocyclohex-1-enyl, phenyl, p-methoxyphenyl, p-chlorophenyl, 3,4-methylenedioxyphenyl, p-dimethylaminophenyl, 2-furyl or 2,6-dimethylhept-1,5-dienyl, $m$ is 1–2, $n$ is 3–5 when $m$ is 1 and is 1–3 when $m$ is 2.

---

This invention resides in the chemical arts. More particularly it relates to that part of organic chemistry having to do with carotenoid compounds.

Carotenoid compounds are organic compounds of aliphatic molecular structure and of aliphatic-alicyclic molecular structure which structures contain partly dehydrogenated isoprene groups (from 3 or 4 to 8 or more). These groups are present in a chain in such a way that the alternate single and double bonds (conjugated double bonds) form a chromophoric system.

In the feeding of poultry, particularly chickens, there is a need for materials which, when ingested by poultry, cause the skin and fat to acquire a yellow tint that is desired by certain ethnic groups, and produce a coloration in the yolks of eggs laid by such poultry, which coloration is desired by manufacturers of cake mixes, egg noodles and the like. Many commercial, poultry feeds such as, for example, those based on milo as a substitute for corn, while otherwise quite adequate for poultry nutrition, are deficient in such materials.

A number of naturally occurring and known synthetic carotenoid compounds are poultry colorants or pigmenters. Representative of these compounds are lutein, zeaxanthin, canthaxanthin, physalien, helenien and β-apo-carotenoic acid methyl ester.

On the other hand a number of known carotenoid compounds are not deposited in poultry skin and fat and in poultry eggs to any appreciable extent. Representative of these compounds are the carotenes such as β-carotene, ε-carotene, bis-dehydro-β-carotene, and the like.

An object of this invention is to provide new carotenoid compounds which are poultry colorants or pigments.

There is also a need for edible food colorants suitable for coloring margarine, butter, cheese, fruit juice, soft drinks, candy and other foods.

Another object of this invention is to provide new carotenoid compounds which are useful as food colorants.

These and other objects as may appear hereinafter are achieved by this invention.

In summary, this invention comprises a group of new carotenoid compounds. The compounds of this group are represented by the generic formula:

$$R-A_m-B_n-A'-R'$$

wherein R is a univalent radical selected from the group consisting of the 2,6,6-trimethylcyclohex-1-enyl radical, the 2,6,6-trimethylcyclohex-1,3-dienyl radical, the 2,6,6-trimethyl - 3 - acetoxycyclohex - 1 - enyl radical and the 2,6,6 - trimethyl - 3 - ketocyclohex-1-enyl radical, A is the divalent 3-methyl-1,3-butadienyl-radical

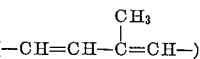

B is the divalent ethylene radical (—CH=CH—), A' is the divalent 2-methyl-1,3-butadienyl radical

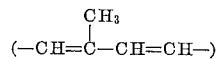

R' is a univalent radical selected from the group consisting of the 2,6,6-trimethylcyclohex-1-enyl radical, the 2,6,6-trimethylcyclohex-1,3-dienyl radical, the 2,6,6-trimethyl-3-acetoxycyclohex-1-enyl radical, the 2,6,6-trimethyl - 3-ketocyclohex-1-enyl radical, the phenyl radical, the p-methoxyphenyl radical, the p-chlorophenyl radical, the 3, 4-methylenedioxyphenyl radical, the p - dimethylaminophenyl radical, the 2-furyl radical and the 2,6-dimethylhept-1,5-dienyl radical

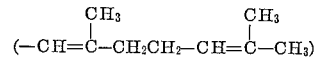

$m$ is 1–2 with $n$, when $m$ is 1, being 3–5 and, when $m$ is 2, being 1–3.

Examples of compounds according to this formula include:

$$R-A-B_n-A'-R', \quad n=3-5$$

1,14-bis (2,6,6-trimethylcyclohex-1-enyl)-3,12-dimethyltetradec-1,3,5,7,9,11,13-heptaene.
1,14-bis (2,6,6-trimethylcyclohex-1,3-dienyl)-3,12-dimethyltetradec - 1,3,5,7,9,11,13-heptaene.
1-(2,6,6-trimethylcyclohex-1-enyl)-14-phenyl-3,12-dimethyltetradec-1,3,5,7,9,11,13-heptaene.
1-(2,6,6-trimethylcyclohex-1-enyl)-14-(p-methoxyphenyl)-3,12-dimethyltetradec-1,3,5,7,9,11,13-heptaene.
1,16-bis(2,6,6-trimethylcyclohex-1-enyl)-3,14-dimethylhexadec-1,3,5,7,9,11,13,15-octaene
1,18-bis(2,6,6-trimethylcyclohex-1-enyl)-3,16-dimethyloctadec-1,3,5,7,9,11,13,15,17-nonaene.

$$R-A_2-B_n-A'-R', \quad n=1-3$$

1,14 - bis(2,6,6-trimethylcyclohex - 1 - enyl) - 3,7,12-trimethyltetradec - 1,3,5,7,9,11,13 - heptaene.
1,14 - bis(2,6,6 - trimethylcyclohex - 1,3 - dienyl) - 3,7,12-trimethyltetradec - 1,3,5,7,9,11,13-heptaene.
1 - (2,6,6 - trimethylcyclohex - 1 - enyl) - 14 - (2,6,6-trimethylcyclohex - 1,3 - dienyl) - 3,7,12 - trimethyltetradec - 1,3,5,7,9,11,13-heptaene.
1 - (2,6,6 - trimethylcyclohex - 1,3 - dienyl) 14 - (2,6,6-trimethylcyclohex - 1 - enyl) 3,7,12 - trimethyltetradec-1,3,5,7,9,11,13-heptaene.
1 - (2,6,6 - trimethylcyclohex - 1 - enyl) - 14 - phenyl-3,7,12 - trimethyltetradec - 1,3,5,7,9,11,13 - heptaene.
1 - (2,6,6 - trimethylcyclohex - 1,3 - dienyl) - 14 - phenyl-3,7,12 - trimethyltetradec - 1,3,5,7,9,11,13 - heptaene.
1 - (2,6,6 - trimethylcyclohex - 1 - enyl) - 14 - (p - chlorophenyl) - 3,7,12 - trimethyltetradec - 1,3,5,7,9,11,13-heptaene.
1 - (2,6,6 - trimethylcyclohex - 1 - enyl) - 14 - p-methoxyphenyl) - 3,7,12, trimethyltetradec - 1,3,5,7,9,11,13-heptaene.
1 - (2,6,6 - trimethylcyclohex - 1,3-dienyl)-14-(p-methoxyphenyl) - 3,7,12, trimethyltetradec - 1,3,5,7,9,11,13-heptaene.

1 - (2,6,6-trimethylcyclohex-1-enyl)-14-(3,4-methylenedioxyphenyl) - 3,7,12, trimethyltetradec - 1,3,5,7,9,11,13-heptaene.

1 - (2,6,6 - trimethylcyclohex-1,3-dienyl)-14-(3,4-methylenedioxyphenyl) - 3,7,12 - trimethyltetradec 1,3,5,7,9,11,13-heptaene.

1 - (2,6,6 - trimethylcyclohex - 1 - enyl)-14-(p-dimethyl aminophenyl) - 3,7,12 - trimethyltetradec - 1,3,5,7,9,11,13-heptaene.

1 - (2,6,6 - trimethylcyclohex - 1 - enyl) - 14 - (2-furyl)-3,7,12-trimethyltetradec-1,3,5,7,9,11,13-heptaene.

1 - (2,6,6 - trimethylcyclohex - 1 - enyl)-3,7,12,16,20-pentamethylheneicos-1,3,5,7,11,13,15,19-nonaene.

1 - (2,6,6 - trimethylcyclohex - 1,3 - dienyl) - 3,7,12,16,20-pentamethylheneicos-1,3,5,7,9,11,13,15,19-nonaene.

1,14 - bis(2,6,6 - trimethyl - 3 - acetoxycyclohex - 1-enyl)-3,7,12-trimethyltetradec-1,3,5,7,9,11,13-heptaene.

1,14 - bis(2,6,6-trimethyl - 3 - ketocyclohex - 1 - enyl)-3,7,12-trimethyltetradec-1,3,5,7,9,11,13-heptaene.

1,16 - bis(2,6,6 - trimethylcyclohex - 1 - enyl) - 3,7,14-trimethylhexadec-1,3,5,7,9,11,13,15-octaene.

1 - (2,6,6-trimethylcyclohex - 1 - enyl) - 16 - phenyl-3,7,14-trimethylhexadec-1,3,5,7,9,11,13,15-octaene.

1,18 - bis(2,6,6 - trimethylcyclohex - 1 - enyl) - 3,7,16-trimethyloctadec-1,3,5,7,9,11,13,15,17-nonaene.

The compounds of this invention, when added to chicken feed free of skin and egg yolk pigmenters, cause the skin and fat of chickens ingesting the feed to have a yellowish tint and the yolks of their eggs to become yellow. In addition, the compounds of this invention are useful as food colorants.

The compounds of this invention generally are synthesized by coupling together by the Wittig reaction appropriate intermediates which are either commercially available or made by known reactions and procedures from commercially available chemicals.

This invention is further illustrated by the following working examples of various aspects of this invention, including preferred specific embodiments thereof. This invention is not limited to these specific embodiments unless otherwise indicated. Typical quantities and light absorption data are given parenthetically in the examples. In addition, reference is made in the examples to the shank skin pigmentation of the carotenoid compound made according to the specific embodiment of the process of the example involved. In each case, this is based on actual tests wherein a sample of the carotenoid compound was actually fed for 7 days to 3 week old Hallcross White Leghorn cockerels which had been kept on a pigment-low diet from birth and which were depleted of skin pigments at the time the carotenoid compound was introduced into their diet. At the end of 7 days the shank skin pigmentation was assessed visually by a panel of four people. The shank skin pigmentation noted in the examples represents the conclusion of the panel.

EXAMPLE I

This example illustrates a specific embodiment of the process for synthesis of 1,14-bis(2,6,6-trimethyl-cyclohex-1 - enyl) - 3,12 - dimethyltetradec - 1,3,5,7,9,11,13-heptaene.

Carbethoxymethylene triphenylphosphonium bromide (47.3 grams) in methanol (100 milliliters) is added to sodium (2.3 grams) dissolved in methanol (100 milliliters). Beta-ionylideneacetaldehyde (22.8 grams) in methanol (100 milliliters) is added to the solution and the mixture stirred for 18 hours at 20° C. Thereafter, the solids (triphenylphosphine oxide) are removed by filtration, the filtrate is diluted with diethyl ether and washed with dilute hydrochloric acid and water. The washed ether solution is dried and the ether removed by evaporation. The residue, a syrup, is dissolved in petroleum ether (B.P. 35–65° C.) solvent, filtered and the solvent removed by evaporation. The residue is a product consisting essentially of 5-methyl-7-(2,6,6-trimethylcyclohex - 1 - enyl) - hepta - 2,4,6-trien-1-oic acid ethyl ester ($C_{17}$ acid ester)(25.5 grams) [E(1%, 1 cm., ethanol) (327 m$\mu$)=1050].

This $C_{17}$ acid ester is dissolved in anhydrous diethyl ether (200 milliliters), and cooled to 0° C. To this solution is added dropwise over a period of 15 minutes lithium aluminum hydride (150 milliliters of an 0.8 molar ethereal solution). Excess lithium aluminum hydride is then destroyed with acetone and the resulting ether solution washed with dilute acid, sodium bicarbonate and water. The washed solution is then dried over sodium sulfate and the ether removed by evaporation. The residue is a product (23 grams) [E(1%, 1 cm., ethanol)(287 m$\mu$)=860] consisting essentially of 5 - methyl - 7 - (2,6,6-trimethylcyclohex - 1 - enyl) - hepta - 2,4,6 - triene - 1 - ol ($C_{17}$ alcohol).

The $C_{17}$ alcohol (5.0 grams) is dissolved in petroleum ether (B.P. 35–65° C.; 50 milliliters). To the resulting solution is added activated manganese dioxide (50 grams). The resulting mixture is stirred for 18 hours. Thereafter, the reaction mixture is filtered to remove the manganese dioxide. The filtrate is then purified by chromatography (sodium aluminum silicate), whereby there is obtained a product (3.6 grams) [E(1%, 1 cm., ethanol)(342 m$\mu$)=790] consisting essentially of 5-methyl–7-(2,6,6-trimethylcyclohex-1-enyl) - hepta - 2,4,6-triene-1-al ($C_{17}$ aldehyde).

A quantity (2.0 grams) of the $C_{17}$ alcohol is dissolved in methanol (6 milliliters). To the methanolic solution are added triphenylphosphine (2.1 grams) and 2 N methanolic hydrogen chloride (4.0 milliliters). The resulting mixture is stirred at 20–25° C. for 18 hours and then cooled to −10° C. To the mixture is added 2 N methanolic potassium hydroxide solution (4.1 milliliters). The resulting mixture is then admixed with a cold (−10° C.) methanolic solution of the $C_{17}$ aldehyde (2.0 grams). The reaction mixture thus obtained is allowed to warm to 20–25° C. during 18 hours. The solids which form during this time are separated by filtration, dissolved in chloroform to remove insoluble material and recrystallized from chloroform-methanol. The result is the desired product (0.26 gram) [E(1%, 1 cm., cyclohexane)(427 m$\mu$)= 2040] consisting essentially of 1,14 - bis(2,6,6 - trimethylcyclohex - 1 - enyl) - 3,12 - dimethyltetradec-1,3,5,7,9,11, 13-heptaene.

The poultry shank skin color of this product is yellow-green.

EXAMPLE 2

This example illustrates a specific process for the synthesis of 1,14 - bis(2,6,6 - trimethylcyclohex-1,3-dienyl)-3,12 - dimethyltetradec-1,3,5,7,9,11,13-heptaene.

Carbethoxymethylenetriphenylphosphonium bromide (79.2 grams) is slurried in methanol (150 milliliters) at 0° C. Solutions of beta-ionylidene acetaldehyde (45 grams, 96.5% pure) in methanol (150 milliliters) and methanolic potassium hydroxide (11.2 grams in methanol, 200 milliliters) at 0° C. are added simultaneously. The resulting slurry is stirred at 0° C. for 1 and ½ hours and then allowed to warm to 20–25° C. overnight. The solids (triphenylphosphine oxide) are removed from the mixture by filtration and the filtrate diluted with diethylether and washed with dilute hydrochloric acid and water. The washed ether solution is dried over sodium sulfate and the diethylether removed by evaporation. The residue, a syrup, is dissolved in petroleum ether (B.P. 36–65° C.), filtered and the solvent removed. The result is a product (42 grams) [E(1%, 1 cm., ethanol) (328 m$\mu$)=927] consisting essentially of 5 - methyl - 7 - (2,6,6-trimethylcyclohex-1-enyl) - hepta - 2,4,6 - triene - 1 - oic acid ethyl ester ($C_{17}$ acid ester).

$C_{17}$ acid ester (40.0 grams) is dissolved in chloroform (400 milliliters) and cooled to 10° C. N-bromosuccinimide (27 grams) is added with vigorous stirring. After 20 minutes N-phenylmorpholine (29 grams) is added and the solution is established and maintained for 15 minutes at the reflux temperature. Thereafter the resulting solution is cooled to 10° C. and washed thoroughly with 5% hydrochloric acid, sodium bicarbonate and water. The solvent is then removed by evaporation from the washed solution to give a product (38.2 grams) [E(1%, 1 cm., ethanol)(360 m$\mu$)=720] consisting essentially of 5-methyl - 7 - (2,6,6 - trimethylcyclohex-1,3 - dienyl)-hepta-2,4,6 - triene - 1 - oic acid ethyl ester (dehydro $C_{17}$ acid ester).

Dehydro $C_{17}$ acid ester (13.53 grams) is dissolved in anhydrous diethyl ether (400 milliliters), cooled to 0° C. and reduced by the dropwise addition over a period of 15 minutes of lithium aluminum hydride (80 milliliters of a 0.8 molar ethereal solution). Excess lithium aluminum hydride is then destroyed with acetone and the ether solution is washed with dilute acid, sodium bicarbonate and water. After drying the washed solution over sodium sulfate, the diethyl ether is removed by evaporation, leaving a product (12.3 grams) [E(1%, 1 cm., ethanol)(321 m$\mu$)=675] consisting essentially of 5 - methyl - 7 - (2,6,6-trimethylcyclohex-1,3 - dienyl) - hepta - 2,4,6-triene-1-ol (dehydro $C_{17}$ alcohol).

Dehydro $C_{17}$ alcohol (5.22 grams) is dissolved in petroleum ether (B.P. 35–65° C.) solvent and stirred with activated manganese dioxide (35 grams). After 18 hours the manganese dioxide is removed by filtration and the solvent removed by evaporation from the filtrate. The residue is a product (4.22 grams) [E(1%, 1 cm., ethanol) (336 m$\mu$)=610] consisting essentially of 5-methyl-7-(2,6,6 - trimethylcyclohex - 1,3 - dienyl)-hepta-2,4,6-triene-1-al (dehydro $C_{17}$ aldehyde).

Dehydro $C_{17}$ alcohol (5 grams) is dissolved in methanol (15 milliliters) at 0° C. Triphenylphosphine (5.5 grams) and 2 N methanolic hydrogen chloride (10.6 milliliters) are admixed with the methanolic solution. The resulting solution is stirred at 0° C. for 1 hour and then at 65° C. for ½ hour. It is then cooled to 0° C. and to it are simultaneously added dehydro $C_{17}$ aldehyde (4.99 grams) and methanolic potassium hydroxide (1.15 grams of potassium hydroxide in 15 milliliters of methanol). The reaction mixture which results is stirred at 0° C. for ¾ hour and at 20–25° C. for about 18 hours. The solids which have formed during this time are filtered off, washed with methanol, water and methanol, and dried. The result is a product (0.132 gram) [E(1%, 1 cm., cyclohexane) (438.5 m$\mu$)=1485] consisting essentially of 1,14 - bis(2, 6, 6 - trimethylcyclohex - 1,3 - dienyl)-3,12-dimethyltetradec-1,3,5,7,9,11,13-heptaene.

The poultry shank skin color of this compound is yellow.

EXAMPLE 3

This example illustrates a specific embodiment of a process for the synthesis of 1-(2,6,6 - trimethylcyclohex-1-enyl) - 14 - phenyl - 3,12 - dimethyltetradec - 1,3,5,7,9, 11,13-heptane.

5-phenyl - 3 - methyl - 2,4 - pentadiene - 1-carboxylic acid is made from benzaldehyde by the process of Cawley and Nelan, JACS 77, 4125 and 4130 (1955). A quantity (4.7 grams) of this acid in dry diethylether (175 milliliters) is reduced by the dropwise addition thereto over a period of 15 minutes of lithium aluminum hydride (33 milliliters) of a 0.75 M diethylether solution. Thereafter, excess lithium aluminum hydride is destroyed with acetone and the ether solution is washed with dilute acid, sodium bicarbonate and water. The washed ether solution is then dried and the diethylether removed by evaporation. The residue is a product (3.97 grams) [E(1%, 1 cm., ethanol)(288 m$\mu$)=1465] consisting essentially of 5-phenyl-3-methyl-2,4-pentadiene-1-ol.

To a solution of carbethoxymethylenetriphenylphosphonium bromide (22 grams) in methanol (50 milliliters) at 0° C. is added a cold (0° C.) solution of potassium hydroxide (3.07 grams) in methanol (50 milliliters). After 30 seconds, 5-methyl-7-(2,6,6-trimethylcyclohex-1-enyl)-hepta-2,4,6-triene-1-al (12.0 grams) [E(1%, 1 cm., ethanol)(342 m$\mu$)=855], prepared as described in Example 1, is added. The resulting solution is stirred at 20–25° C. for 1 hour and then poured into petroleum ether (B.P. 35–65° C.) solvent (200 milliliters) and water (200 milliliters). The petroleum ether (B.P. 35–65° C.) solvent layer is washed with dilute hydrochloric acid, sodium bicarbonate and water. The solvent is then removed by evaporation, whereby there is obtained a product (10 grams) [E(1%, 1 cm., ethanol)(365 m$\mu$)= 1000] consisting essentially of 7 - methyl - 9 - (2,6,6-trimethylcyclohex-1-enyl)-nona-2,4,6,8-tetraene - 1 - oic acid ethylester (13-desmethylretinoic acid ethylester).

13-desmethylretinoic acid ethylester (10 grams) is dissolved in anhydrous diethylether (80 milliliters) and the resulting solution is cooled to −20° C. Lithium aluminum hydride (60 milliliters of a 0.8 N solution in diethylether) is added and after 10 minutes the excess lithium aluminum hydride is destroyed with acetone. The ethereal solution is washed with dilute sulfuric acid, 3% potassium hydroxide solution and water. The washed solution is then dried over sodium sulfate and the diethylether removed by evaporation. The residue is a product (10 grams) [E(1%, 1 cm., ethanol)(323 m$\mu$)=1000] consisting essentially of 7-methyl-9-(2,6,6-trimethylcyclohex-1-enyl)-nona-2,4,6,8-tetraene-1-ol (13-desmethylretinol).

To a solution of 13-desmethylretinol (7 grams) dissolved in petroleum ether (B.P. 35–65° C.) solvent (70 milliliters) is added activated manganese dioxide (70 grams). After 18 hours, the manganese dioxide is removed by filtration and washed with additional solvent, the combined filtrate and wash liquid reduced by evaporation of solvent to a volume of 70 milliliters and then chromatographed. There results a product (5.2 grams) [E(1%, 1 cm., ethanol)(367 m$\mu$)=1000] consisting essentially of 7-methyl-9-(2,6,6-trimethylcyclohex-1-enyl)-nona-2,4,6,8-tetraene-1-al(13 desmethylretinal).

To a solution of 5-phenyl-3-methyl-2,4-pentadiene-1-ol (3.76 grams) dissolved in methanol (13 milliliters) are admixed triphenylphosphine (5.85 grams) and 2.6 N methanolic hydrogen chloride (8.8 milliliters). The resulting mixture is stirred for 3 hours at 20–25° C., whereby a triphenylphosphonium salt solution is formed. A 15 milliliter portion of this solution is removed and cooled to 0° C. To it is added 2 N methanolic potassium hydroxide (3 milliliters). Then 13-desmethylretinal (2.5 grams) followed by 2 N methanolic potassium hydroxide (3 milliliters). The resulting reaction mixture is left for 18 hours at 20–25° C. During this time a sticky solid material forms therein. The material is removed by filtration and recrystallized from chloroform-methanol. The result is a product (120 milligrams) [E(1%, 1 cm., chloroform) (433 m$\mu$)=2360] consisting essentially of 1-(2,6,6-trimethylcyclohex-1-enyl)-14-phenyl-3,12-dimethyltetradec-1,3,5,7,9,11,13-heptaene.

The poultry shank skin pigmentation is yellow-green.

EXAMPLE 4

This example illustrates the specific embodiment of a process for making 1-(2,6,6-trimethylcyclohex-1-enyl)-14-(p-methoxyphenyl)-3,12-dimethyltetradec-1,3,5,7,9,11,13-heptaene.

Cut lithium wire (7.6 grams) is added to liquid ammonia (1 liter) containing ferric nitrate (0.5 gram) and the resulting mixture stirred for 1 hour, during which time a solution is formed. Purified acetylene gas is bubbled into the solution for ½ hour. 4-(p-methoxyphenyl)-3-butene-2-one (100 grams) dissolved in anhydrous ether (75 milliliters) is then added over a period of 25 minutes with stirring at −40° C. The resulting mixture is stirred at this temperature for the next 3 hours. Ammonia and excess acetylene are then carefully removed by warming the resulting solution over a steam bath. Diethylether is added and the resulting ether solution washed several times with brine. The salt solutions are re-extracted with diethylether. The ether extracts are added to the ether solution which is then washed with 10% potassium carbonate solution and brine until neutral. The washed ether solution is dried over anhydrous sodium sulfate and a portion of the ether is removed by evaporation. The remaining ether solution is then chromatographed on alumina, whereby there is obtained a product (34.0 grams) of the ethynyl carbinol together with a fraction (59.0 grams) of less pure material.

The ethynyl carbinol (34.0 grams) is dissolved in cyclohexane (360 milliliters) containing 5% palladium deposited on calcium carbonate and deactivated with zinc acetate. The reaction mixture is shaken in the presence of hydrogen gas at normal pressure until 4.2 liters of hydrogen is consumed. Then the mixture is filtered and the filter cake washed thoroughly with diethylether. The filtrate and wash liquid are combined and washed with the dilute (5%) hydrochloric acid, 10% sodium carbonate solution and water to neutrality. The washed solution is dried over anhydrous sodium sulfate and the diethylether is removed under vacuum at 30–40° C. The residue (31.8 grams) consists of 5-(p-methoxyphenyl)-3-hydroxy-3-methyl-1,4-pentadiene.

5 - (p-methoxyphenyl)-3-hydroxy-3-methyl-1,4-pentadiene (1.73 grams) is dissolved in methanol (7 milliliters). After cooling the resulting solution to 0° C., there is admixed with it triphenylphosphine (2.2 grams) and 2 N methanolic hydrogen chloride (4.25 milliliters). The resulting mixture is allowed to warm to 20–25° C. and after 1 hour at this temperature is refluxed for 15 minutes. It is then cooled to 0° C. 2 N methanolic potassium hydroxide (4.25 milliliters) followed by 13-desmethylretinal (2.3 grams), made as by the procedure of Example 3, are then added. The temperature of the resulting reaction mixture is allowed to rise to 20–25° C. and after 1 hour at this temperature, the solids which have formed therein are removed by filtration, washed with methanol, water and methanol and dried. The result is a product (0.224 gram) [E(1%, 1 cm., cyclohexane)(428 mµ)= 1920] consisting essentially of 1-(2,6,6-trimethylcyclohex-1-enyl)-14-(p-methoxyphenyl)-3,12-dimethyltetradec-1,3,5,7,9,11,13-heptaene.

The poultry shank skin pigmentation resulting from this carotenoid compound is yellow.

EXAMPLE 5

This example illustrates a specific embodiment of a process for the synthesis of 1,16-bis(2,6,6-trimethylcyclohex-1 - enyl) - 3,14 - dimethylhexadec - 1,3,5,7,9,11,13, 15-octaene.

To a solution of 13-desmethylretinol (3.7 grams), prepared as by the procedure described in Example 3, in methanol (8 milliliters) are added triphenylphosphine (3.5 grams) and 2.6 N methanolic hydrogen chloride (5.3 milliliters). The mixture thus obtained is stirred for 3 hours at 20° C. and then cooled to 0° C. 2 N methanolic potassium hydroxide (4.0 milliliters) followed by $C_{17}$ aldehyde (4.0 grams), prepared as described in Example 1, in methanol (20 milliliters) followed by additional 2 N methanolic potassium hydroxide (3.2 milliliters) are added to it. The resulting reaction mixture is left for 18 hours at 20° C. During this time solids form in the reaction mixture. They are collected by filtration and recrystallized from chloroform-methanol. The product (0.22 gram)[E(1%, 1 cm., chloroform)(440 mµ)=2140] is typically in the form of orange plate-like crystals. The product consists essentially of 1,16-bis(2,6,6-trimethylcyclohex - 1 - enyl) - 3,14 - dimethylhexadec - 1,3,5,7,9, 11,13,15-octaene.

The poultry shank skin pigmentation is yellow with a slight greenish cast.

EXAMPLE 6

This example illustrates a specific embodiment of a process for the synthesis of 1,18-bis(2,6,6-trimethylcyclohex - 1 - enyl) - 3,16 - dimethyloctadec - 1,3,5,7,9,11,13, 15,17-nonaene.

13-desmethylretinol (3.74 grams), prepared as by the procedure described in example 3 is dissolved in methanol (8 milliliters). To the resulting solution are added triphenylphosphine (3.52 grams) and 2.6 N methanolic hydrogen chloride (5.3 milliliters). The resulting mixture is stirred for 18 hours at 20–25° C. and then cooled to 0° C. 2 N methanolic potassium hydroxide (4.0 milliliters) followed by 13-desmethylretinal (3.2 grams), prepared as by the procedure described in Example 3, in methanol (20 milliliters) followed by 2 N potassium hydroxide (3.2 milliliters) are then admixed. The thus formed reaction mixture is held for 18 hours at 5° C. During this time solids form therein. These are separated by filtration, washed with methanol, water and methanol, and recrystallized from chloroform-methanol to give an orange crystalline product (0.42 grams)[(1%, 1 cm. chloroform)(455 mµ)=2340]. This product consists essentially of 1,18 - bis(2,6,6 - trimethylcyclohex - 1 - enyl) - 3,16 - dimethyloctadec-1,3,5,7,9,11,13,15,17-nonaene.

The poultry shank skin pigmentation of this carotenoid compound is yellow.

EXAMPLE 7

This example illustrates a specific embodiment of a process for the preparation of 1,14-bis(2,6,6-trimethylcyclohex - 1 - enyl) - 3,7,12 - trimethyltetradec - 1,3,5,7,9, 11,13-heptaene.

To a solution of retinol (0.95 gram, 0.0033 mole) in methanol (4.5 milliliters) are added under nitrogen triphenylphosphine (0.875 gram, 0.0033 mole) followed by 2.1 N methanolic hydrogen chloride (1.6 milliliters). The resulting reaction solution is stirred at 20–25° C. for 2½ hours and then cooled to 0° C. A solution of beta-ionylidene acetaldehyde (0.80 gram, 0.0036 mole) in methanol (2 milliliters) and a solution of potassium hydroxide (0.187 gram) in methanol (2 milliliters) are added to the reaction solution. The reaction mixture which results is stirred for ½ hour at 0° C. and then allowed to stand at 5° C. for 18 hours. During this time solids form in the reaction mixture. The solids are collected by filtration, washed successively with methanol, water and methanol, and then dried under vacuum over calcium chloride. The product so obtained is a yellow material (1.41 grams) [E(1%, 1 cm. cyclohexane)(417 mµ)=1821]. Recrystallization of the product from chloroform-methanol results in an end product (0.85 gram, M.P. 154–155° C.) [(1%, 1 cm., cyclohexane)(419 mµ)=2030], the particles of which are yellow and needlelike in form. The product consists essentially of 1,14-bis(2,6,6-trimethylcyclohex - 1 - enyl) - 3,7,12 - trimethyltetradec - 1,3,5,7,9, 11,13-heptaene.

The poultry shank skin pigmentation is yellow-green.

EXAMPLE 8

This example illustrates a specific embodiment of a process for the synthesis of 1,14-bis(2,6,6-trimethylcyclohex - 1,3, - dienyl) - 3,7,12 - trimethyltetradec - 1,3,5,7, 9,11,13-heptaene.

Beta-ionone (412 grams), 94% pure is dissolved in carbon tetrachloride (2 liters) and warmed to reflux temperature. N-bromosuccinamide (400 grams) is added over 30 minutes, and the mixture refluxed for 15 minutes. The resulting solution is cooled, N-ethylmorpholine (400 grams) added thereto, and the carbon tetrachloride removed under reduced pressure. The resulting syrup is warmed to 100° C. for 30 minutes. After cooling the syrup to 20–25° C., diethyl ether (1 liter) is admixed with it and the resulting solution is washed thoroughly with 10% hydrochloric acid and then with sodium bicarbonate and water. The diethyl ether solution is dried over potassium carbonate and the diethyl ether removed by evaporation to give a crude, dehydro beta-ionone product (429 grams) [E(1%, 1 cm., ethanol)(343 mμ)=440]. The crude product is distilled by falling film evaporation, the 60–65° C. boiling point fraction (163.0 grams) [E(1%, 1 cm., ethanol) (342 mμ)=555] being collected. This fraction consists essentially of dehydro-beta-ionone.

Cut lithium wire (0.76 gram) is added to liquid ammonia (100 milliliters) containing ferric nitrate (0.05 gram), and the resulting mixture is stirred for 1 hour, whereby a solution is formed. Dehydro-beta-ionone (10 grams) dissolved in anhydrous diethylether (75 milliliters) is then added over a period of 25 minutes with stirring at −40° C. The resulting mixture is stirred at −40° C. for the next 3 hours. Ammonia and excess acetylene are then carefully removed from the mixture by warming it over a steam bath. Diethylether is added, forming a solution, and the solution is washed several times with brine. The brine washings are extracted with fresh diethylether and the ether extract combined with the washed solution. The washed solution is further washed with 10% potassium carbonate solution and brine till neutral. It is then dried over anhydrous sodium sulfate and the diethylether removed therefrom by evaporation. The result is an amber colored oil (10.09 grams). A sample (4.0 grams) of the oil is purified by chromatography (sodium aluminum silicate) to give ethynyl - dehydro - beta - ionol (1.66 grams).

Ethynyl-dehydro-beta-ionol (1.30 grams) is dissolved in cyclohexane (12 milliliters) containing 5% palladium deposited on calcium carbonate and partially deactivated with zinc acetate (0.25 gram). Hydrogen gas (140 milliliters) is then introduced into the cyclohexane at normal pressure. The resulting mixture is filtered and the filtered cake washed thoroughly with diethylether. The ether wash liquid is combined with the filtrate and the filtrate is washed with dilute (5%) hydrochloric acid, 10% sodium carbonate solution and water to neutrality. The washed solution is dried and the diethylether is removed under vacuum at 30–40° C. The residue is a light brown oil (1.33 grams) [E(1%, 1 cm., cyclohexane)(296 mμ)= 482] consisting essentially of vinyl-dehydro-beta-ionol.

To a solution of vinyl-dehydro-beta-ionol (1.30 grams) in methanol (1.5 milliliters) are added under nitrogen at 0° C. triphenylphosphine (1.56 grams) and 2 N methanolic hydrogen chloride (3.15 milliliters). The resulting reaction mixture is stirred at 0° C. for 3 hours and then at 26° C. for 18 hours. It is then cooled to 0° C. Thereafter there are simultaneously added to it a solution of dehydroretinal (1.83 grams) in methanol (5 milliliters) and potassium hydroxide (0.378 gram) in methanol (4 milliliters). The mixture thus formed is stirred for 3 hours at 0° C. and then it is allowed to stand at 5° C. for 18 hours. During this time, red solids form in the mixture. The solids are collected by filtration, washed successively with methanol, water and methanol, and then dried under vacuum over calcium chloride. The product (2.05 grams) [E(1%, 1 cm., cyclohexane) (447.5 mμ)=1742] is in the form of brick red solids. Crystallization of a sample (0.50 gram) of the product from chloroform-ethanol gives an end product (0.27 gram, M.P. 141–142° C.) [E(1%, 1 cm., cyclohexane)(448.5 mμ)=1938] composed of orange-red needlelike crystals. The end product consists essentially of 1,14-bis(2,6,6-trimethylcyclohex-1,3 - dienyl) - 3,7,12 - trimethyl tetradec - 1,3,5,7,9,11,13-heptaene.

The poultry shank skin pigmentation of this carotenoid compound is yellow.

EXAMPLE 9

This example illustrates a specific embodiment of a process for the synthesis of 1-(2,6,6-trimethylcyclohex-1,3 - dienyl) - 14 - (2,6,6 - trimethylcyclohex - 1 - enyl)-3,7,12-trimethyl-tetradec-1,3,5,7,9,11,13-heptaene.

To a solution of beta-ionylidene ethanol (1.0 gram) dissolved in methanol (3 milliliters) are added triphenylphosphine (1.19 grams) and 2 N methanolic hydrogen chloride (2.3 milliliters). The resulting mixture is stirred under nitrogen at 20–25° C. for 21 hours. The mixture is then cooled to 0° C. There are then added simultaneously to it over a 10 minute period a solution of dehydroretinal (1.42 grams) in methanol (7 milliliters) and a solution of potassium hydroxide (0.38 gram) in methanol (3 milliliters). The reaction mixture thus formed is stirred for 2 hours at 0° C. and then for 18 hours at 20–25° C. During this period of time solids form in the reaction mixture. The solids are collected, washed with methanol, water and methanol, and dried. The result is a product (1.52 grams)[E(1%, 1 cm., cyclohexane)(436 mμ)= 1770] in the form of orange solids. Crystallization of the product from chloroform-methanol gives an end product (0.82 gram, M.P. 143–145° C.)[E(1%, 1 cm. cyclohexane) (436 mμ)=2110], (orange crystals). The end product consists essentially of 1-(2,6,6-trimethylcyclohex-1,3-dienyl) - 14 - (2,6,6 - trimethylcyclohex - 1 - enyl) - 3,7,12-trimethyltetradec-1,3,5,7,9,11,13-heptaene.

EXAMPLE 10

This example illustrates a specific embodiment of a process for the synthesis of 1-(2,6,6-trimethylcyclohex-1 - enyl) - 14 - (2,6,6 - trimethylcyclohex - 1,3 - dienyl) - 3,7,12-trimethyltetradec-1,3,5,7,9,11,13-heptaene.

Triphenylphosphine (1.56 grams) and 2 N methanolic hydrogen chloride (3.15 milliliters) are admixed under nitrogen at 0° C. with a solution of vinyl-dehydro-beta-ionol (1.31 grams), prepared as by the procedure described in Example 8, in methanol (1.5 milliliters). The resulting reaction mixture is stirred at 0° C. for 3 hours and then at 26° C. for 18 hours. It is then cooled to 0° C. To it are added simultaneously a solution of retinal (1.83 grams) in methanol (5 milliliters) and a solution of potassium hydroxide (0.378 gram) in methanol (4 milliliters). This results in a second reaction mixture. The second reaction mixture is stirred for 3 hours at 0° C. and then it is permitted to stand at 5° C. for 18 hours. During this time, orange solids form. The solids are removed by filtration, washed with methanol and with water and methanol, and then dried under vacuum. Crystallization of the solids from chloroform-methanol gives the desired end product (0.70 gram, M.P. 143–144° C.) [E(1%, 1 cm., cyclohexane)(437 mμ)=2050]. The product, orange crystals, consists essentially of 1-(2,6,6-trimethylcyclohex - 1 - enyl) - 14 - (2,6,6 - trimethylcyclohex-1,3-dienyl) - 3,7,12 - trimethyltetradec - 1,3,5,7,9,11, 13-heptaene.

The poultry shank skin pigmentation resulting from this carotenoid compound is yellow with a slight greenish cast.

EXAMPLE 11

This example illustrates a specific embodiment of a process for the synthesis of 1-(2,6,6-trimethylcyclohex-1-enyl) - 14 - phenyl-3,7,12 - trimethyltetradec - 1,3,5,7, 9,11,13-heptaene.

5 - phenyl-3-methylpenta - 2,4-diene-1-ol (3.76 grams), made as by the procedure described in Example 3, is dissolved in methanol (13 milliliters). To the resulting solution are added triphenylphosphine (5.85 grams) and 2.6 N methanolic hydrogen chloride (8.8 milliliters). The resulting solution is stirred at 20° C. for 3 hours. A 15 milliliter aliquot portion of the solution is removed and cooled at 0° C. 2 N methanolic potassium hydroxide (3 milliliters) followed by retinal (3 grams) followed by 2 N methanolic potassium hydroxide (3 milliliters) are added to the aliquot portion. The resulting mixture is allowed to stand for 2 hours at 20° C. The solids which form in the mixture during this period of time are collected by filtration, washed with methanol, water and methanol, and then dried. They are then crystallized from chloroform-methanol. The result is a product (0.61 gram) [E(1%, 1 cm., chloroform)(437 m$\mu$=2540] consisting essentially of 1 - (2,6,6 - trimethylcyclohex-1-enyl) - 14-phenyl - 3,7,12 - trimethyltetradec - 1,3,5,7,9,11,13-heptaene.

The poultry shank skin pigmentation resulting from this carotenoid compound is yellow with a slight greenish cast.

EXAMPLE 12

This example illustrates a specific embodiment of a process for making 1 - (2,6,6 - trimethylcyclohex - 1,3-dienyl)-14-phenyl-3,7,12-trimethyltetradec - 1,3,5,7,9,11,13-heptaene.

5-phenyl-3-methylpenta - 2,4 - diene-1-ol (3.95 grams) prepared as by the procedure described in Example 3, is dissolved in methanol (28 milliliters). To the resulting solution at 5° C. are added triphenylphosphine (6.0 grams) and 1.5 N methanolic hydrogen chloride (10 milliliters). The resulting reaction mixture is allowed to stand at 20–25° C. for 18 hours. It is then cooled to 0° C. and there are simultaneously added to it a solution of dehydroretinal (7.3 grams) in methanol (21 milliliters) and 21% methanolic potassium hydroxide (10 milliliters). This results in another reaction mixture which is then stirred at 0° C. for 2½ hours. During this time, the solids which form in the reaction mixture are collected by filtration, washed thoroughly with methanol, warm water and then methanol, and then dried. The result is a crude product (2.47 grams)[E(1%, 1 cm., cyclohexane)-(437 m$\mu$)=1980]. The crude product is crystallized from benzene, giving the desired end product (1.38 grams, M.P. 150.5–151.5° C.) [E(1%, 1 cm., cyclohexane)(440, 453 m$\mu$)=2395, 2342]. The end product violet crystals, consists essentially of 1-(2,6,6-trimethylcyclohex-1,3-dienyl)-14-phenyl-3,7,12-trimethyltetradec - 1,3,5,7,9,11,13-heptaene.

The poultry shank skin pigmentation resulting from this carotenoid compound is yellow.

EXAMPLE 13

This example illustrates a specific embodiment of a process for the synthesis of 1-(2,6,6-trimethylcyclohex-1-enyl) - 14 - (p-chlorophenyl)-3,7,12-trimethyltetradec-1,3,5,7,9,11,13-heptaene.

5 - (p-chlorophenyl) - 3 - methylpenta-2,4-diene-1-carboxylic acid is made according to the process of Cawley and Nelan, JACS 77, 4125, 4130 (1955). A quantity (15 grams) of this acid is dissolved in anhydrous diethylether (150 milliliters).

Lithium aluminum hydride (45 milliliters of a 1.0 molar ether solution) is added dropwise over a period of 15 minutes to the ether solution of the acid. Acetone is then added to the resulting reaction mixture to destroy excess lithium aluminum hydride, and then the reaction mixture is washed with dilute acid, sodium bicarbonate and water. After drying the reaction mixture, the diethyl ether is removed therefrom by evaporation. The residue (12 grams) [E(1%, 1 cm., cyclohexane)(293 m$\mu$)= 1225] consists essentially of 5-(p-chlorophenyl)-3-methylpenta-2,4-diene-1-ol. This alcohol (10 grams) is dissolved in diethyl ether (150 milliliters). To this solution is added activated manganese dioxide (150 grams) and the mixture is stirred. After 18 hours, the manganese dioxide is removed by filtration, the filtered cake washed with diethyl ether, the wash liquid combined with the filtrate and the diethyl ether removed from the filtrate. The result is a product (8.74 grams)[E(1%, 1 cm., cyclohexane)-(323 m$\mu$)=1060] consisting essentially of 5-(p-chlorophenyl)-3-methylpenta-2,4-diene-1-al.

Retinol (2.5 grams) is dissolved in methanol (7.5 milliliters) and the resulting solution cooled to 10° C. To this solution are added triphenylphosphine (2.3 grams) and 2.6 N methanolic hydrogen chloride (3 milliliters). The reaction mixture that results is stirred at 25° C. for 2 hours and cooled to 0° C. A solution of 5-(p-chlorophenyl)-3-methylpenta - 2,4 - diene-1-al (2.2 grams) dissolved in methanol (7.5 milliliters) and 10% methanolic potassium hydroxide (5.6 milliliters) are added simultaneously with vigorous stirring to the reaction mixture. After stirring for 2 hours at 0° C., the mixture is allowed to stand at 20–25° C. for 18 hours. The solids which form in the mixture are separated by filtration, and washed thoroughly with methanol and water methanol. The solids are then dried. The result is a crude product (0.86 gram) [E(1%, 1 cm., cyclohexane)(424 m$\mu$)= 1528]. Crystallization of the crude product from chloroform-methanol gives the desired end product (0.26 gram, M.P. 125–126° C.) [E(1%, 1 cm., cyclohexane)(424 m$\mu$=1680]. The end product in the form of orange red crystals, consists essentially of 1-(2,6,6 - trimethylcyclohex-1-enyl)-14-(p-chlorophenyl) - 3,7,12 - trimethyltetradec-1,3,5,7,9,11,13-heptaene.

The poultry shank skin pigmentation resulting from this carotenoid is yellow-green.

EXAMPLE 14

This example illustrates a specific embodiment of a process for making 1-(2,6,6-trimethylcyclohex-1-enyl)-14-(p-methoxyphenyl) - 3,7,12-trimethyltetradec - 1,3,5,7, 9,11,13-heptaene.

5 - (p - methoxyphenyl) - 3 - methylpenta - 2,4 - diene-1-carboxylic acid is made according to the process of Cawley and Nelan 77, 4125 and 4130 (1955). The acid (11 grams) is dissolved in methylethylketone (250 milliliters) and admixed with potassium carbonate (20 grams) and methyl iodide (17 milliliters). The mixture is refluxed for about 1 hour and then cooled to 20–25° C. After cooling the reaction mixture, the diethyl ether is admixed with it, the mixture is washed with water and the resulting washed ether solution is dried and the ether removed by evaporation. The residue consists essentially of 5-(p-methoxyphenyl) - 3 - methylpenta-2,4-diene-1-carboxylic acid methylester.

The methylester product (13.6 grams) is dissolved in dry diethyl ether (400 milliliters). Lithium aluminum hydride (85 milliliters of a 0.8 molar ether solution) is added dropwise over a period of 15 minutes to the methylester solution. Thereafter, excess lithium aluminum hydride is destroyed with acetone and the mixture is washed with dilute acid, sodium bicarbonate and water. The mixture is then dried and the diethyl ether removed by evaporation. The residue (12.65 grams) [E(1%, 1 cm., ethanol) (293 m$\mu$)=1247] consists essentially of 5-(p-methoxyphenyl)-3-methylpenta-2,4-diene-1-ol.

A solution of 5-(p-methoxyphenyl)-3-methylpenta-2,4-diene-1-ol (4.2 grams) in methanol (25 milliliters) is mixed with triphenylphosphine (5.4 grams) and 3 N methanolic hydrogen chloride (7 milliliters). The solution that results is brought to reflux temperature and then allowed to cool to 20–25° C. over a period of 18 hours. The solution is then cooled to 0° C. and retinal (6.5 grams) in methanol (15 milliliters) and potassium hydroxide (1.20 grams) dissolved in methanol (15 milliliters) are simultaneously added to it. The resulting reaction mixture is allowed to come to 20–25° C. and is stirred for 6½ hours. During this time orange solids form in the reaction mixture. They are collected by filtration and washed successively with methanol, water and methanol. The solids are then dried. The result is a crude product (4.7 grams) [E(1%, 1 cm., cyclohexane)(434 m$\mu$)=1800]. The solids are recrystallized from benzene to give the desired end product. (2.5 grams, M.P. 150–151° C.) [E(1%, 1 cm., cyclohexane)(434 m$\mu$)=2700]. The end product, orange crystals, consists essentially of 1 - (2,6,6 - trimethylcyclohex - 1 - enyl) - 14 - (p - methoxyphenyl) - 3,7,12 - trimethyltetradec - 1,3,5,7,9,11,13-heptaene.

The poultry shank skin color resulting from this carotenoid compound is yellow with a slight greenish cast.

EXAMPLE 15

This example illustrates a specific embodiment of a process for the preparation of 1-(2,6,6-trimethylcyclohex-1,3 - dienyl) - 14 - (p - methoxyphenyl) - 3,7,12 - trimethyltetradec-1,3,5,7,9,11,13-heptaene.

5 - (p - methoxyphenyl) - 3 - hydroxy - 3 - methylpenta-1,4-diene (6.94 grams), made as by the procedure described in Example 4, is dissolved in methanol (28 milliliters). The resulting solution is cooled to 0° C. and then there are added to it triphenylphosphine (8.92 grams) and 2 N methanolic hydrogen chloride (17 milliliters). The resulting solution is allowed to stand at 20–25° C. for 1 hour. Then, it is refluxed for 15 minutes and finally cooled to 0° C. 2 N methanolic potassium hydroxide (17 milliliters) followed by dehydroretinal hydroquinone adduct (11.0 grams) are added to the solution, forming a reaction mixture. The reaction mixture is permitted to warm to 20–25° C. and after 3 hours, the solids that have formed therein are separated by filtration, washed with methanol and then with water methanol, dried, and then recrystallized from benzene-methanol. The result is a product (0.34 gram) [E(1%, 1 cm., cyclohexane)(445 m$\mu$)=2350] consisting essentially of 1-(2,6,6-trimethylcyclohex - 1,3 - dienyl) - 14 - (p - methoxyphenyl) - 3,7, 12-trimethyltetradec-1,3,5,7,9,11,13-heptaene.

The poultry shank skin pigmentation resulting from this carotenoid is yellow.

EXAMPLE 16

This example illustrates a specific embodiment of a process for the synthesis of 1-(2,6,6-trimethylcyclohex-1-enyl) - 14 - (3,4 - methylenedioxyphenyl) - 3,7,12 - trimethyltetradec-1,3,5,7,9,11,13-heptaene.

5 - (3,4 - methylenedioxyphenyl) - 3 - methylpenta-2,4-diene-1-carboxylic acid is prepared according to the process of Cawley and Nelan, JACS 77, 4125 and 4130 (1955). A quantity (10 grams) of this acid is dissolved in anhydrous diethylether (100 milliliters). Lithium aluminum hydride (40 milliliters of a 1.0 molar ether solution) is added dropwise to the ether solution, whereby the acid is reduced to the corresponding alcohol. Acetone is added to the resulting reaction mixture in order to destroy excess lithium aluminum hydride. The reaction mixture is then washed with dilute acid, sodium bicarbonate and water. After drying the mixture, the diethylether is removed by evaporation. The residue (2 grams) [E(1%, 1 cm., ethanol)(320 m$\mu$)=1340] consists essentially of 5 - (3,4 - methylenedioxyphenyl) - 3 - methylpenta - 2,4-diene-1-ol.

A quantity (1.0 gram) of 5-(3,4-methylenedioxyphenyl)-3-methyl-2,4-pentadiene-1-ol is dissolved in methanol (10 milliliters). Triphenylphosphine (1.4 grams) and 2.6 N methanolic hydrogen chloride (2.0 milliliters) are added to the solution which is then allowed to stand at 20–25° C. for 18 hours. The solution is then cooled to 0° C. and 2 N methanolic potassium hydroxide (2 milliliters) followed by retinal (1.3 grams) followed by 2 N methanolic potassium hydroxide (2 milliliters) are added. The slurry that results is stirred at 20–25° C. for 18 hours. Thereafter, the solids in the mixture are removed by filtration, washed with methanol, water and methanol and then recrystallized from chloroformmethanol. The result is the desired end product (0.28 gram) [E(1%, 1 cm., chloroform)(443 m$\mu$)=2580] consisting essentially of 1-(2,6,6-trimethyl-cyclohex-1-enyl)-14-(3,4-methylene dioxphenyl) - 3,7,12 - trimethyltetradec - 1,3, 5,7,9,11,13-heptaene.

The poultry shank skin coloration due to this carotenoid compound is yellow.

EXAMPLE 17

This example illustrates a specific embodiment of a process for the synthesis of 1-(2,6,6-trimethylcyclohex-1, 3 - dienyl) - 14 - (3,4 - methylenedioxyphenyl) - 3,7,12-trimethyltetradec-1,3,5,7,9,11,13-heptaene.

5 - (3,4 - methylenedioxyphenyl) - 3 - methylpenta-2,4-diene-1-ol (3 grams), made as by the procedure described in Example 16, is dissolved in methanol (100 milliliters). Triphenylphosphine (5.4 grams) and 2.6 N methanolic hydrogen chloride (8 milliliters) are added to the solution. The resulting solution is stirred for 18 hours at 20–25° C. It is then cooled to 0° C. and 2 N methanolic potassium hydroxide (6.0 milliliters) followed by dehydro retinal hydroquinone adduct (6.4 grams) followed by 2 N methanolic potassium hydroxide (4.0 milliliters) are admixed with it. The resulting slurry is stirred at 20–25° C. for 1 hour. The solids therein are removed by filtration, washed with methanol, water and methanol, dried and then recrystallized from chloroform-methanol. There is thus obtained a product (0.330 gram) [E(1%, 1 cm., chloroform)(460 m$\mu$)=1750] consisting essentially of 1-(2,6,6-trimethylcyclohex-1,3-dienyl)-14-(3,4 - methylenedioxyphenyl) - 3,7,12 - trimethyltetradec-1,3,5,7,9,11,13-hepatene.

The poultry shank skin color resulting from this compound is golden.

EXAMPLE 18

This example illustrates a specific embodiment of a process for the synthesis of 1-(2,6,6-trimethylcyclohex-1 - enyl) - 14 - (p - dimethylaminophenyl) - 3,7,12 - trimethyltetradec-1,3,5,7,9,11,13-heptaene.

5 - (p - dimethylaminophenyl) - 3 - methylpenta - 2,4-diene-1-carboxylic acid is made according to the process of Cawley and Nelan 77, 4125 and 4130 (1955). To a solution of the acid (9 grams) in anhydrous diethyl ether (400 milliliters) is added dropwise over a period of 15 minutes lithium aluminum hydride (80 milliliters of a 0.8 molar ethereal solution) whereby the acid is reduced to the corresponding alcohol. Acetone is added to the reaction mixture to destroy excess lithium aluminum hydride and the reaction mixture is washed with dilute acid, sodium bicarbonate and water. The washed mixture is then dried and the diethyl ether evaporated. The residue (3.2 grams) [E(1%, 1 cm., ethanol)(325 m$\mu$)=1150] consists essentially of 4-(p-dimethylaminophenyl)-3-methyl penta-2,4-diene-1-ol.

To a solution of 5-(p-dimethylaminophenyl)-3-methyl-2,4-pentadiene-1-ol (2 grams) dissolved in methanol (20 milliliters) triphenylphosphine (2.4 grams) and 2.6 N methanolic hydrogen chloride (4 milliliters) are added. The solution turns a deep blue color, but goes colorless on addition of more 2.6 N methanolic hydrogen chloride (3 milliliters). The solution which results is stirred at 20–25° C. for 18 hours. An aliquot (15 milliliters) portion of the solution is removed and cooled to 0° C. 2 N methanolic potassium hydroxide (15 milliliters) and retinal (2.1 grams) are added simultaneously to the solution. The slurry which forms is stirred at 20–25° C. for 2½ hours and then filtered. The solids thereby obtained are washed with methanol, water and methanol and then recrystallized from chloroform-methanol to give an end product (0.49 gram) [E(1%, cm., chloroform) (458 m$\mu$)=2000] consisting essentially of 1-(2,6,6-trimethylcyclohex - 1 - enyl) - 14 - (p - dimethylaminophenyl)-3,7,12-trimethyltetradec-1,3,5,7,9,11,13-heptaene.

The poultry shank skin pigmentation of this carotenoid compound is golden.

EXAMPLE 19

This example illustrates a specific embodiment of a process for the synthesis of 1-(2,6,6-trimethylcyclohex-1-enyl) - 14 - (2 - furyl) - 3,7,12 - trimethyltetradec - 1,3, 5,7,9,11,13-heptaene.

5-(2-furyl)-3-methylpenta-2,4-diene-1-carboxylic acid is made by the process of Cawley and Nelan JACS 77, 4125 and 4130 (1955). To a quantity (4.35 grams) of this acid dissolved in anhydrous diethylether (130 milliliters (cooled at 0° C. there is added dropwise over a period of 15 minutes lithium aluminum hydride (30 milliliters of a 0.8 molar ethereal solution). Upon completion of the addition of the lithium hydride, acetone is added to the resulting reaction mixture for the purpose of destroying excess lithium aluminum hydride. The reaction mixture is then washed with dilute acid, sodium bicarbonate and water. The washed mixture is then dried over anyhydrous sodium sulfate and the diethylether removed by evaporation to give a product (3.73 grams) [E(1%, 1 cm., ethanol)(298 m$\mu$)=1578] consisting essentially of 5-(2-furyl)-3-methylpenta-2,4-dien-1-ol.

To a solution of 5-(2-furyl)-3-methylpenta-2,4-dien-1-ol (3.7 grams) dissolved in methanol (10 milliliters) are added triphenylphosphine (6.0 grams) and 3 N methanolic hydrogen chloride (7.6 milliliters). The resulting solution is stirred under nitrogen atmosphere at 20–25° C. for 2 hours, then at 50° C. for 10 minutes and then for 18 hours at 20–25° C. The reaction mixture is then cooled to 0° C. To it are added simultaneously a solution of retinal (7.1 grams) in methanol (15 milliliters) and potassium hydroxide (1.41 grams) in methanol (15 milliliters). This gives a second reaction mixture. It is stirred at 5° C. for 2½ hours. During this time solids are formed therein. These solids are collected by filtration, washed successively with methanol, water and then with methanol. The result is a crude product (5.42 grams) [E(1%, 1 cm., cyclohexane) (436 m$\mu$)=1450]. The crude product is then subject to crystallization at 5° C. from chloroform methanol. The result is a product (0.6 gram, M.P. 138–139° C.) [E(1%, 1 cm., cyclohexane) (436, 463 m$\mu$)=2920, 2590], consisting of solids which are orange crystals. The product consists essentially of 1-(2,6,6-trimethylcyclohex-1-enyl)-14-(2-furyl)-3,7,12-trimethyltetradec-1,3,5,7,9,11,13-heptaene.

The poultry shank skin coloration due to this carotenoid is yellow.

EXAMPLE 20

This example illustrates a specific embodiment of a process for the synthesis of 1-(2,6,6-trimethylcyclohex-1-enyl) - 3,7,12,16,20 - pentamethylheneicos-1,3,5,7,9,11,13,15,19-nonaene.

Cut lithium wire (0.54 gram) is added to liquid ammonia (700 milliliters) containing ferric nitrate (0.35 gram), and the resulting mixture is stirred for 1½ hours at 20–25° C., whereby a solution is formed. Purified acetylene gas is bubbled into the solution with stirring at −40° C. for 1 hour. Next, pseudo ionone (74.2 grams) dissolved in anhydrous diethylether (175 milliliters) is added over a period of 15 minutes to the solution, and the resulting mixture is stirred at −40° C. for 4 hours. Thereafter, the excess ammonia and acetylene are allowed to evaporate from the reaction mixture while it is stirred for 18 hours without additional cooling. Anhydrous diethylether (250 milliliters) is added to the reaction mixture. It is cooled to 0° C. and then it is carefully hydrolyzed with 10% sulfuric acid. The resulting ether phase is separated from the aqueous phase and the aqueous phase is salted and extracted with diethyl ether (175 milliliters. The ether extract is combined with the ether phase and the augmented phase or solution is washed successively with water, sodium bicarbonate solution and water. The washed solution is then dried over anhydrous sodium sulfate and the diethylether evaporated therefrom. The residue is an amber oil (76.5 grams). The oil is purified by chromatography on alumina, resulting in a product (61.4 grams) consisting essentially of ethynyl-pseudo ionol (95% purity).

A quantity (9.48 grams) of the ethynyl-pseudo ionol product is dissolved in cyclohexane (95 milliliters) containing piperidine (1.0 gram). Pulverized catalyst (2.4 grams) partially deactivated by the method of Lindlar is added to the solution and then the solution is hydrogenated at normal pressure with hydrogen gas (945 milliliters). The resulting mixture is filtered and the filtrate is washed with dilute (5%) hydrochloric acid, 10% sodium carbonate solution and then water to neutrality. The washed filtrate is dried over anhydrous sodium sulfate and then the diethylether is removed therefrom by evaporation under vacuum at 35° C. The residue is yellow oil (8.60 grams) [E(1%, 1 cm., cyclohexane) (242 m$\mu$)=1040]. The yellow oil consists essentially of vinylpseudo ionol.

To a quantity (1.75 grams) of vinyl-pseudo ionol in methanol (5 milliliters) under nitrogen at 0° C. are added triphenylphosphine (2.16 grams) and 1.5 N methanolic hydrogen chloride (5.5 milliliters). The resulting reaction mixture is stirred at 0° C. for 2 hours and then at 25° C. for 18 hours. After cooling this reaction mixture to 0° C., a solution of sodium methylate (from 0.2 gram of metallic sodium) and retinal (2.3 grams) in methanol (10 milliliters) are admixed simultaneously with it. This gives a second reaction mixture which is stirred for 2 hours at 0° C. and then at 20–25° C. for 2 more hours. This second reaction mixture is then filtered and after decanting the methanol from the filtrate, an oil residue (0.88 gram) [E(1%, 1 cm., cyclohexane) (429 m$\mu$)=1342] is obtained. The oil residue is purified by chromatography on alumina whereby there is obtained a red oil (0.47 gram) [E(1%, 1 cm., cyclohexane) (429 m$\mu$)=2000]. This is the desired end product and it consists essentially of 1-(2,6,6 - trimethylcyclohex - 1 - enyl) - 3,7,12,16,20-pentamethyl henicos-1,3,5,7,9,11,13,15,19-nonaene.

The poultry shank skin pigmentation resulting from this carotenoid is yellow-green.

EXAMPLE 21

This example illustrates a specific embodiment of a process for the synthesis of 1-(2,6,6-trimethylcyclohex-1,3 - dienyl) - 3,7,12,16,20-pentamethylhenicos-1,3,5,7,9,11,13,15,19-nonaene.

To a quantity (1.75 grams) of vinyl-pseudo ionol, prepared as by the procedure described in Example 20, in methanol (5 milliliters) under nitrogen at 0° C. are added triphenylphosphine (2.16 grams) and 1.5 N methanolic hydrogen chloride (5.5 milliliters), whereby a triphenylphosphonium salt reaction mixture is formed. This reaction mixture is stirred at 0° C. for 2 hours and then at 25° C. for 18 hours. After cooling this reaction mixture to 0° C., a solution of metallic sodium (0.2 gram) in methanol (10 milliliters) and dehydro retinal (2.3 grams) in methanol (10 milliliters) are simultaneously added to it, forming a second reaction mixture. This second reaction mixture is stirred at 0° C. for 2 hours and then at 20–25° C. for 2 more hours. An insoluble oil is recovered by decantation and the oil is washed successively with methanol, water and methanol, and then dried under vacuum for 18 hours, giving a crude reaction product (0.40 gram) [E(1%, 1 cm., cyclohexane) (434 m$\mu$)=775]. Purification by chromatography on alumina of the crude reaction product gives a deep red oil (0.260 gram) [E(1%, 1 cm., cyclohexane) (434 m$\mu$)=1680] consisting essentially of 1-(2,6,6-trimethylcyclohex - 1,3 - dienyl)-3,7,12,16,20-pentamethylhenicos-1,3,5,7,9,11,13,15,19-nonaene.

The poultry shank skin pigmentation resulting from this carotenoid compound is yellow.

EXAMPLE 22

This example illustrates a specific embodiment of a process for the synthesis of 1,14-bis(2,6,6-trimethyl-3-acetoxycyclohex-1-enyl) - 3,7,12-trimethyltetradec-1,3,5,7,9,11,13-heptaene.

A quantity of 1,14-bis(2,6,6-trimethylcyclohex-1-enyl)-3,7,12 - trimethyltetradec - 1,3,5,7,9,11,13 - heptaene (7.04 grams) prepared as by the specific embodiment of the process described in Example 7 is dissolved in purified chloroform (800 milliliters) and the resulting solution is cooled to −18° C. A solution of N-bromosuccinimide (5.26 grams) in acetic acid (24 milliliters) in chloroform (500 milliliters) is cooled to −18° C. and admixed directly with the first-mentioned solution, whereby a first reaction mixture is formed. After letting the first reaction mixture stand for 30 seconds at −18° C., N-ethylmorpholine (64 grams) is rapidly added and the reaction temperature of the mixture is allowed to rise to 10° C. Petroleum ether (1 liter) is then added to the mixture, whereupon a phase separation takes place. The petroleum ether layer is separated, washed twice with 0.1 N hydrochloric acid, once with sodium bicarbonate and then with water to neutrality. The washed ether solution is then dried with anhydrous sodium sulfate and the petroleum ether evaporated, giving a product (8.08 grams) [E(1%, 1 cm., cyclohexane) (415 m$\mu$)=1260] consisting essentially of 1,14-bis(2,6,6-trimethyl - 3 - acetoxy-cyclohex-1-enyl)-3,7,12-trimethyltetradec-1,3,5,7,9,11,13-heptaene.

The poultry shank skin pigmentation due to this compound is yellow with slight greenish cast.

EXAMPLE 23

This example illustrates a specific embodiment for the synthesis of 1,14-bis(2,6,6-trimethyl-3-ketocyclohex-1-enyl)-3,7,12-trimethyltetradec-1,3,5,7,9,11,13-heptaene.

A quantity (7.0 grams) of 1,14-bis(2,6,6-trimethyl-3-acetoxy-1-enyl) - 3,7,12-trimethyltetradec-1,3,5,7,9,11,13-heptaene, prepared according to the procedure of Example 22, is admixed with 15% methanolic potassium hydroxide and the resulting mixture stirred at 60° C. for 20 minutes, whereby the carotenoid compound is saponified. The result is a viscous oil (5.96)[E(1%, 1 cm., cyclohexane)(414 m$\mu$)=1310].

A quantity (3.0 grams) of the saponified carotenoid compound is dissolved in toluene (20 milliliters). To the resulting solution is added with stirring freshly distilled aluminum isopropoxide (4.0 grams) in toluene (70 milliliters) containing acetone (8 milliliters). The mixture that results is refluxed for 21 hours, cooled and then diluted with the diethylether (150 milliliters). An ethereal phase forms in the mixture and it is separated, washed four times with dilute (5%) hydrochloric acid, twice with sodium bicarbonate and then with water to neutrality. The ether phase is then dried over anhydrous sodium sulfate and the diethylether removed therefrom by evaporation, giving a reddish solid product (2.6 grams) [E(1%, 1 cm., cyclohexane)(430 m$\mu$)=1162]. The product is recrystallized from benzene-chloroform to give the desired end product (M.P. 167–168° C.) [E(1%, 1 cm., cyclohexane) (438 m$\mu$)=1738]. The product, orange crystals, consists essentially of 1,14-bis(2,6,6-trimethyl-3-ketocyclohex-1-enyl) - 3,7,12 - trimethyltetradec-1,3,5,7,9,11,13-heptaene.

The poultry shank skin coloration of this compound is yellow.

EXAMPLE 24

This example illustrates a specific embodiment of a process for the synthesis of 1,16-bis(2,6,6-trimethylcyclohex-1-enyl)-3,7,14 - trimethylhexadec - 1,3,5,7,9,11,13,15-octaene.

A quantity of (2.0 grams) of $C_{17}$ alcohol, prepared as by the procedure described in Example 1, is dissolved in methanol (6 milliliters), forming a first solution. Admixed with this solution are triphenylphosphine (2.1 grams) followed by 2 N methanolic hydogen chloride (4.0 milliliters). This causes the formation of a triphenylphosphonium salt solution. After stirring this solution at 20–25° C. for 18 hours, it is cooled to −10° C. and 2 N methanolic potassium hydroxide (4.2 milliliters) is added. There is then added a slurry of retinal (1.2 grams) in methanol (4 milliliters) at −10° C. A second reaction mixture is thereby formed. It is allowed to warm to 20–25° C. over an 18 hour period. During this time solids are formed in the reaction mixture. These solids are collected by filtration, washed with methanol, water and methanol and then dried. The solids are recrystallized from chloroform-methanol to give the desired end product (0.29 gram) [E(1%, 1 cm., chloroform) (443 m$\mu$)=2170]. The end product, in the form of red solids, consists essentially of 1,16-bis(2,6,6-trimethylcyclohex-1-enyl)-3,7,14-trimethylhexadec-1,3,5,7,9,11,13,15-octaene.

The poultry shank skin color due to this carotenoid is yellow with a slight greenish cast.

EXAMPLE 25

This example illustrates a specific embodiment of a process for the synthesis of 1-(2,6,6-trimethylcyclohex-1-enyl)-16-phenyl-3,7,14-trimethylhexadec - 1,3,5,7,9,11,13,15-octaene.

A quantity (7 grams) of 5-phenyl-3-methylpenta-2,4-dien-1-ol), made as by the procedure described in Example 3, is dissolved in methylene dichloride (70 milliliters). To this solution is added activated manganese dioxide (70 grams). The resulting mixture is stirred at 20–25° C. for over 18 hours, whereby the alcohol is oxidized to the corresponding aldehyde. The reaction mixture is filtered, the filter cake washed with fresh methylene dichloride and the wash liquid combined with the filtrate, and the methylene dichloride removed from the filtrate by evaporation, whereby a product (6.5 grams) [E(1%, 1 cm. ethanol) (326 m$\mu$)=1000] consisting essentially of 5-phenyl-3-methylpenta-2,4-dien-1-ol is obtained.

Carboxymethylenetriphenylphosphonium bromide (47.3 grams) dissolved in ethanol (130 milliliters) is added at −10° C. to sodium (2.3 grams) and ethanol (100 milliliters). The resulting solution is stirred for 5 minutes and retinal (28.5 grams) dissolved in ethanol (110 milliliters) is added. The slurry which results is allowed to stand for 18 hours at 20–25° C. and then the ethanol is removed therefrom. The residue is admixed with diethylether (100 milliliters), the solids are removed by filtration and the filtrate is washed with 10% sulfuric acid, sodium bicarbonate and water. The washed filtrate is dried over anhydrous sodium sulfate and the ether removed by evaporation. The residue, a syrup, is dissolved in petroleum ether (B.P. 35–65° C.) solvent and chromatographed (sodium aluminum silicate) to give a $C_{22}$ acid ester product (28.4 grams) [E(1%, 1 cm., ethanol) (387 m$\mu$)=1284].

A quantity (20 grams) of the $C_{22}$ acid ester product is dissolved in anhydrous diethylether (400 milliliters) and the resulting solution cooled to −15° C. Lithium aluminum hydride (80 milliliters of a 0.8 molar solution) is added dropwise over 15 minutes to the solution while keeping the temperature at −15° C. After 5 minutes acetone is added to the resulting mixture to destroy excess lithium aluminum hydride and the mixture is washed with dilute sulfuric acid, 3% potassium hydroxide solution and water. The ether solution which remains is dried over sodium sulfate and then the diethylether is removed by evaporation. The residue is a product (17.7 grams) [E(1%, 1 cm., ethanol) (355 m$\mu$)=910], which consists essentially of 5,9-dimethyl-11-(2,6,6-trimethylcyclohex-1-enyl)-1-deca-2,4,6,8,10-pentaen-1-ol ($C_{22}$ alcohol).

A quantity (2.25 grams) of the $C_{22}$ alcohol is dissolved in methanol (8.0 milliliters). Triphenylphosphine (2.2 grams) and 2.6 N methanolic hydrogen chloride (3.2 milliliters) are added to the resulting solution, forming a second solution, and the second solution is stirred at 20–25° C. for 18 hours. The second solution is then cooled to −20° C. and to it are added in the order named 2 N methanolic potassium hydroxide (2 milliliters), 5-phenyl-3-methylpenta-2,4-diene - 1-ol (4.4 grams) and 2 N methanolic potassium hydroxide (2.2 milliliters). The result is a slurry. It is kept at 20–25° C. for 18 hours. The solids are then removed by filtration, washed with water and methanol to give the desired end product (0.40 gram) [E(1%, 1 cm., chloroform) (443 m$\mu$)=2400]. The product consists essentially of 1-(2,6,6-trimethylcyclohex-1-enyl)-16-phenyl-3,7,14 - trimethylhexadec - 1,3,5,7,9,11,13,15-octaene.

The poultry shank skin coloration attributed to this carotenoid compound is yellow.

EXAMPLE 26

This example illustrates a specific embodiment of a process for the making of 1,18-bis(2,6,6-trimethylcyclohex-1-enyl)-3,7,16 - trimethyloctadec - 1,3,5,7,9,11,13,15,17-nonaene.

A quantity (4.0 grams) of $C_{22}$ alcohol made as by the procedure described in Example 25, is dissolved in methanol (13.5 milliliters). Triphenylphosphine (3.35 grams) and then 2 N methanolic hydrogen chloride (6.5 milliliters) are admixed with the solution, forming a triphosphonium salt solution. The triphenylphosphonium salt solution is stirred at 20–25° C. for 18 hours and is then cooled to −10° C. To it is added 2 N methanolic potassium hydroxide (6.7 milliliters). The resulting solution is then admixed with a solution of $C_{17}$ aldehyde (2.5 grams), made as by the procedure described in Example 1, in methanol (6.7 milliliters) at −10° C. The resulting mixture is permitted to warm to 20–25° C. and to stand for 18 hours. During this time solids form in the mixture. The solids are removed by filtration, washed with methanol, water and methanol, and then recrystallized from chloroform-methanol. The recrystallized solids are the desired end product (0.16 gram) [E(1%, 1 cm., chloroform) (462 m$\mu$)=2350] consisting essentially of 1,18-bis(2,6,6-trimethylcyclohex - 1 - enyl) - 3,7,16 - dimethyloctadec-1,3,5,7,9,11,13,15,17-nonaene.

The poultry shank skin pigmentation caused by this carotenoid compound is yellow.

Thus this invention provides a group of new carotenoid compounds which are poultry pigmenters and food colorants. In this regard, a number of carotenoids in this group are particularly outstanding as poultry pigmenters. These carotenoids comprise:

1,14-bis(2,6,6-trimethylcyclohex-1,3-dienyl)-3,7,12-trimethyltetradec-1,3,5,7,9,11,13-heptaene,
1-(2,6,6-trimethylcyclohex-1,3-dienyl)-14-phenyl-3,7,12-trimethyltetradec-1,3,5,7,9,11,13-heptaene,
1-(2,6,6-trimethylcyclohex-1,3-dienyl)-14-(p-methoxyphenyl)-3,7,12-trimethyltetradec-1,3,5,7,9,11,13-heptaene,
1-(2,6,6-trimethylcyclohex-1-enyl)-14-(3,4-methylenedioxyphenyl)-3,7,12-trimethyltetradec-1,3,5,7,9,11,13-heptaene,
1-(2,6,6-trimethylcyclohex-1,3-dienyl)-14-(3,4-methylene-dioxyphenyl)-3,7,12-trimethyltetradec-1,3,5,7,9,11,13-heptaene, and
1,14-bis(2,6,6-trimethyl-3-ketocyclohex-1-enyl)-3,7,12-trimethyltetradec-1,3,5,7,9,11,13-heptaene.

A number of the carotenoid compounds of this invention gives remarkable egg yolk pigmentation. These compounds comprise:

1-(2,6,6-trimethylcyclohex-1,3-dienyl)-14-phenyl-3,7,12-trimethyltetradec-1,3,5,7,9,13-heptaene, and
1-(2,6,6-trimethylcyclohex-1,3-dienyl)-14-(p-methoxyphenyl)-3,7,12-trimethyltetradec-1,3,5,7,9,11,13-heptaene.

Other features, advantages and specific embodiments of this invention will be readily apparent to those in the exercise of ordinary skill in the art after reading the foregoing disclosures. In this connection, while specific embodiments of processes for the synthesis of compounds of this invention have been described in considerable detail, variations and modifications of these embodiments can be effected without departing from the spirit and scope of the invention as disclosed and claimed.

We claim:

1. A compound according to the formula:

$$R—A_m—B_n—A'—R'$$

wherein R is a radical selected from the group consisting of the 2,6,6-trimethylcyclohex-1-enyl radical, the 2,6,6-trimethylcyclohex-1,3-dienyl radical, the 2,6,6-trimethyl-3-acetoxycyclohex-1-enyl radical and the 2,6,6-trimethyl-3-ketocyclohex-1-enyl radical, A is the divalent 3-methyl-1,3-butadienyl radical, B is the divalent ethylene radical, A' is the divalent 2-methyl-1,3-butadienyl radical, R' is a radical selected from the group consisting of the R radical, the phenyl radical, the p-methoxyphenyl radical, the p-chlorophenyl radical, the 3,4-methylenedioxyphenyl radical, the p-dimethylaminophenyl radical, the 2-furyl radical and the 2,6-dimethylhept-1,5-dienyl radical, m is 1–2 with n when m is 1, being 3–5 and, when m is 2, being 1–3.

2. 1,14 - bis(2,6,6 - trimethylcyclohex - 1 - enyl) - 3,12-dimethyltetradec-1,3,5,7,9,11,13-heptaene.

3. 1,14 - bis(2,6,6 - trimethylcyclohex - 1,3 - dienyl)-3,12-dimethyltetradec-1,3,5,7,9,11,13-heptaene.

4. 1 - (2,6,6 - trimethylcyclohex - 1 - enyl) - 14 - phenyl-3,12-dimethyltetradec-1,3,5,7,9,11,13-heptaene.

5. 1 - (2,6,6 - trimethylcyclohex - 1 - enyl) - 14 - (p-methoxyphenyl)-3,12 - dimethyltetradec - 1,3,5,7,9,11,13-heptaene.

6. 1,16 - bis(2,6,6 - trimethylcyclohex - 1 - enyl) - 3,14-dimethylhexadec-1,3,5,7,9,11,13,15-octaene.

7. 1,18 - bis(2,6,6 - trimethylcyclohex - 1 - enyl) - 3,16-dimetyloctadec-1,3,5,7,9,11,13,15,17-nonaene.

8. 1,14 - bis(2,6,6 - trimethylcyclohex - 1 - enyl) - 3,7,12-trimethyltetradec-1,3,5,7,9,11,13-heptaene.

9. 1,14 - bis(2,6,6 - trimethylcyclohex - 1,3 - dienyl)-3,7,12-trimethyltetradec-1,3,5,7,9,11,13-heptaene.

10. 1 - (2,6,6 - trimethylcyclohex - 1 - enyl) - 14 - (2,6,6-trimethylcyclohex - 1,3 - dienyl) - 3,7,12 - trimethyltetradec-1,3,5,7,9,11,13-heptaene.

11. 1 - (2,6,6 - trimethylcyclohex - 1,3 - dienyl) - 14-(2,6,6 - trimethylcyclohex - 1 - enyl) - 3,7,12 - trimethyltetradec-1,3,5,7,9,11,13-heptaene.

12. 1 - (2,6,6 - trimethylcyclohex - 1 - enyl) - 14-phenyl-3,7,12-trimethyltetradec-1,3,5,7,9,11,13-heptaene.

13. 1 - (2,6,6 - trimethylcyclohex - 1,3 - dienyl) - 14-phenyl-3,7,12-trimethyltetradec-1,3,5,7,9,11,13-heptaene.

14. 1 - (2,6,6 - trimethylcyclohex - 1 - enyl) - 14 - (p-chlorophenyl) - 3,7,12 - trimethyltetradec - 1,3,5,7,9,11,13-heptaene.

15. 1 - (2,6,6 - trimethylcyclohex - 1 - enyl) - 14 - (p-methoxyphenyl) - 3,7,12 - trimethyltetradec - 1,3,5,7,9,11,13-heptaene.

16. 1 - (2,6,6-trimethylcyclohex - 1,3 - dienyl) - 14-(p-methoxyphenyl) - 3,7,12 - trimethyltetradec - 1,3,5,7,9,11,13-heptaene.

17. 1 - (2,6,6 - trimethylcyclohex - 1 - enyl) - 14 - (3,4-methylenedioxyphenyl) - 3,7,12 - trimethyltetradec - 1,3,5,7,9,11,13-heptaene.

18. 1 - (2,6,6 - trimethylcyclohex - 1,3 - dienyl) - 14-(3,4 - methylenedioxyphenyl) - 3,7,12 - trimethyltetradec-1,3,5,7,9,11,13-heptaene.

19. 1 - (2,6,6 - trimethylcyclohex - 1 - enyl) - 14 - (p-dimethylaminophenyl) - 3,7,12 - trimethyltetradec - 1,3,5,7,9,11,13-heptaene.

20. 1 - (2,6,6 - trimethylcyclohex - 1 - enyl) - 14 - (2-furyl)-3,7,12-trimethyltetradec-1,3,5,7,9,11,13-heptaene.

21. 1 - (2,6,6 - trimethylcyclohex - 1 - enyl) - 3,7,12,16,20 - pentamethylheneicos - 1,3,5,7,9,11,13,15,19-nonaene.

22. 1 - (2,6,6 - trimethylcyclohex - 1,3 - dienyl) - 3,7,12,16,20 - pentamethylheneicos - 1,3,5,7,9,11,13,15,19-nonaene.

23. 1,14 - bis(2,6,6 - trimethyl - 3 - acetoxycyclohex-1 - enyl) - 3,7,12 - trimethyltetradec - 1,3,5,7,9,11,13-heptaene.

24. 1,14 - bis(2,6,6 - trimethyl - 3 - ketocyclohex - 1-enyl)-3,7,12-trimethyltetradec-1,3,5,7,9,11,13-heptaene.

25. 1,16 - bis(2,6,6 - trimethylcyclohex - 1 - enyl) - 3,7,14-trimethylhexadec-1,3,5,7,9,11,13,15-octaene.

26. 1 - (2,6,6 - trimethylcyclohex - 1 - enyl) - 16-phenyl - 3,7,14 - trimethylhexadec - 1,3,5,7,9,11,13,15-octaene.

27. 1,18 - bis(2,6,6 - trimethylcyclohex - 1 - enyl) - 3,7,16-trimethyloctadec-1,3,5,7,9,11,13,15,17-nonaene.

References Cited

UNITED STATES PATENTS 3,125,571    3/1964    Chechak et al. _ _ _ _ _ _ 260—240

JOHN D. RANDOLPH, Primary Examiner

U.S. Cl. X.R.

99—4, 65, 105, 116, 121, 134; 260—576, 577, 612, 649, 587, 668, 657.5, 488, 666